(12) United States Patent
Michel

(10) Patent No.: US 8,317,003 B2
(45) Date of Patent: Nov. 27, 2012

(54) WHEEL SUSPENSION FOR MOTOR VEHICLES

(75) Inventor: Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 743 days.

(21) Appl. No.: 12/048,962

(22) Filed: Mar. 14, 2008

(65) Prior Publication Data

US 2009/0072460 A1    Mar. 19, 2009

(30) Foreign Application Priority Data

Mar. 14, 2007   (DE) .......................... 10 2007 012 203

(51) Int. Cl.
*F16F 9/10* (2006.01)
*F16F 9/56* (2006.01)
*B60G 17/02* (2006.01)

(52) U.S. Cl. .................... 188/321.11; 267/218; 267/221; 267/225; 267/252; 267/255; 280/5.514; 280/6.151; 280/124.162; 280/124.165; 280/124.179

(58) Field of Classification Search ............... 188/299.1, 188/321.11; 267/195, 217, 218, 221, 225, 267/228, 248, 251, 252, 255; 280/124.157, 280/124.162, 124.164, 124.165, 124.179, 280/5.514, 6.157, 6.151

See application file for complete search history.

(56) References Cited

U.S. PATENT DOCUMENTS

| | | | | |
|---|---|---|---|---|
| 4,248,410 A | * | 2/1981 | Sano et al. | ............. 280/124.157 |
| 5,244,190 A | * | 9/1993 | Bianchi | ......................... 267/248 |
| 2006/0163787 A1 | * | 7/2006 | Munster et al. | ............... 267/221 |
| 2006/0175787 A1 | * | 8/2006 | Munster et al. | ........ 280/124.145 |

FOREIGN PATENT DOCUMENTS

| | | |
|---|---|---|
| DE | 12 41 717 | 6/1967 |
| DE | 4232136 A1 * | 3/1994 |
| DE | 101 01 694 | 5/2002 |
| DE | 10 2005 001 739 | 7/2006 |
| EP | 1 609 633 | 12/2005 |
| EP | 1 681 181 | 7/2006 |
| FR | 2 996 223 | 4/1994 |
| FR | 2 840 257 | 12/2003 |
| JP | 60-94810 | 5/1985 |
| JP | 63-101115 | 5/1998 |
| JP | 2001-88527 | 4/2001 |
| WO | WO 2006/012858 | 2/2006 |
| WO | WO 2006/018050 | 2/2006 |
| WO | 2006/131343 | 12/2006 |

* cited by examiner

*Primary Examiner* — Thomas J Williams
(74) *Attorney, Agent, or Firm* — Novak Druce + Quigg LLP

(57) ABSTRACT

The invention relates to a wheel suspension for motor vehicles, with a suspension strut which is formed from a shock absorber and a bearing spring, the bearing spring being supported by way of spring plates on the body of the motor vehicle and on the tube of the shock absorber, and a spring plate being movably guided relative to the body and able to be moved axially by means of an actuator relative to the shock absorber tube, and the suspension strut having a preloaded spring with a spring force which is opposite the bearing spring, which is supported on the body of the motor vehicle and also on the movable spring plate of the bearing spring. According to the invention, the actuator is located outside, in particular radially outside the suspension strut.

9 Claims, 3 Drawing Sheets

WHEEL SUSPENSION FOR MOTOR VEHICLES

CROSS-REFERENCE TO RELATED APPLICATIONS

This application claims priority from German Application No. 102007012203.0 filed Mar. 14, 2007, hereby incorporated by reference in its entirety.

The invention relates to a wheel suspension for motor vehicles.

BACKGROUND OF THE INVENTION

A wheel suspension such as this is shown for example in JP-A-63 101115, according to which the motor vehicle can be adjusted to two level positions. Here the shock absorber-side spring plate of the bearing spring of the suspension strut can be moved relative to the body by way of an actuator and a hydraulic cylinder and a rod. The spring force of the bearing spring plus the dynamic wheel load fluctuations in this design continuously loads the actuator and its rod and accordingly should be made stiff and wear-resistant. The actuator must be designed for high positioning forces.

Conversely, DE 10 2005 001 739 A1 discloses a generic wheel suspension with a suspension strut which, in addition to a bearing spring, has a preloaded spring connected thereto in series. The bearing spring is supported on a spring plate on the shock absorber tube of the suspension strut shock absorber and on an adjustable spring plate which is movably guided by means of an actuator relative to the shock absorber tube of the suspension strut. The preloaded spring, connected in series to the bearing spring, with its spring force opposes the bearing spring and is supported on the vehicle body and also on the movably guided spring plate of the bearing spring.

In the generic wheel suspension, the movable spring plate is rotationally adjusted by means of an electric motor in conjunction with a ball screw. The rotary drive is integrated within the suspension strut here. As a result of the integrated rotary drive, the amount of space required by the suspension strut in the exceedingly cramped installation space of the wheel suspension is increased.

The object of the invention is to make available a wheel suspension with a suspension strut which is made compact with reduced space requirement.

The object of the invention is to make available a wheel suspension with a suspension strut which is made compact with reduced space requirement.

SUMMARY OF THE INVENTION

According to the present invention, the actuator is located outside, in particular radially outside the suspension strut. The externally mounted actuator eliminates the drive within the suspension strut. In this way, on the one hand the suspension strut can be arranged compactly, while the actuator is attached to the vehicle body, for example, spaced at a distance from the suspension strut in a manner which favors installation space, and acts on the movably guided spring plate by way of a rod.

In this context, the actuator in a linear lifting motion can apply a tensile and/or compressive force to the movable spring plate so that a rotary drive can be omitted.

By preference the movably guided spring plate radially outside its spring support for the bearing spring or the preloaded spring can have a coupling point for the actuator. The coupling point can be located on the movably guided spring plate in the axial direction opposite the spring support for the preloaded spring or the bearing spring.

According to the invention, around the shock absorber, as a second helical compression spring, there is a preloaded spring with a spring force directed opposite the bearing spring. The preloaded spring is supported on the body of the motor vehicle and also on the movable spring plate of the bearing spring. The preloaded spring is thus connected between the body and the bearing spring in a structurally favorable manner around the shock absorber and acts more or less as the inner force which opposes the spring force of the bearing spring.

Preferably the spring force of the preloaded spring corresponds more or less to the required spring force of the bearing spring with the motor vehicle empty (in the design position). The movable spring plate is accordingly free of force under this loading, i.e., the bearing spring and the preloaded spring are in equilibrium. As a result, only positioning forces, when the level of the body of the motor vehicle is being adjusted and forces from radial load fluctuations, need be accommodated by way of the actuator. The external actuator which is not mounted on the suspension strut can be, for example, the identical part for all four individual wheel suspensions of the motor vehicle.

The bearing spring and the preloaded spring can be positioned essentially on top of one another in the structurally advantageous manner of the invention, the bearing spring being securely supported directly or indirectly on the shock absorber tube and the preloaded spring being securely supported on the body, and the moveable spring plate is connected functionally between the two springs.

Furthermore, one of the springs can be made larger in diameter than the other spring, the two springs being at least partially telescoped into one another. Thus the structural circumstances of the wheel suspension can be considered to an increased degree; for example the overall length of the two springs can be shortened and their installation space in the radial direction can be matched to the required free space in the range of motion of the wheel suspension elements.

In particular, the upper preloaded spring can be made larger in diameter than the underlying bearing spring.

An especially durable design of the suspension strut which is favorable for production engineering is achieved by the movable spring plate being guided on a guide sleeve which is located around the shock absorber tube and the piston rod of the shock absorber and which is attached to the upper, body-side spring plate of the preloaded spring.

To achieve smooth and largely wear-free guidance, the movable spring plate can be supported on the guide sleeve by way of a linear antifriction bearing.

To change the spring rate of the bearing spring in a controlled manner, within the guide sleeve there can conventionally be an additional, rubber-elastic spring which is supported on the spring plate of the preloaded spring and which comes into contact with the shock absorber tube as the wheel suspension is increasingly deflected, and thus counteracts undue springing of the wheel suspension with high loading of the motor vehicle.

In a preferred development of the invention, it is proposed that the body-mounted actuator is made electromechanical with an electric motor and gearing and is coupled to the movable spring plate via a more or less horizontally running lever and a connecting rod which is aligned more or less axially parallel to the shock absorber. This yields a design which enables reliable delivery of force and which can be mounted in a structurally favorable manner on the wheel suspension. The actuator can be attached to a longitudinal member and/or cross member of the vehicle body which runs more or less at the height of the shock absorber tube to achieve stable attachment.

Analogously, a shock absorber-side spring plate of the identical material is molded integrally onto the shock absorber stalk which connects the suspension strut to the wheel suspension element. The shock absorber-side spring plate is therefore molded directly on the shock absorber stalk. This measure contributes advantageously to further shortening of the overall length of the suspension strut with the preloaded spring and the bearing spring, and fasteners for the shock absorber-side spring plate can be omitted.

In contrast, in the prior art the shock absorber-side spring plate spaced axially at a distance from the shock absorber stalk is provided on the shock absorber tube. The shock absorber-side spring plate with its cap rim is joined first at the axial height of the shock absorber tube, in which the clamping tabs of the conventionally used clamping catches of the shock absorber stalk between which the shock absorber tube is clamped are no longer disruptive. In the prior art therefore the installation space between the shock absorber-side spring plate and the shock absorber stalk cannot be used.

Finally, in another structural simplification for installation engineering the shock absorber tube can be screwed into the shock absorber stalk by way of a threaded connection which is aligned coaxially to the middle axis of the shock absorber.

DETAILED DESCRIPTION OF THE PREFERRED EMBODIMENTS OF THE INVENTION

Figure 1:
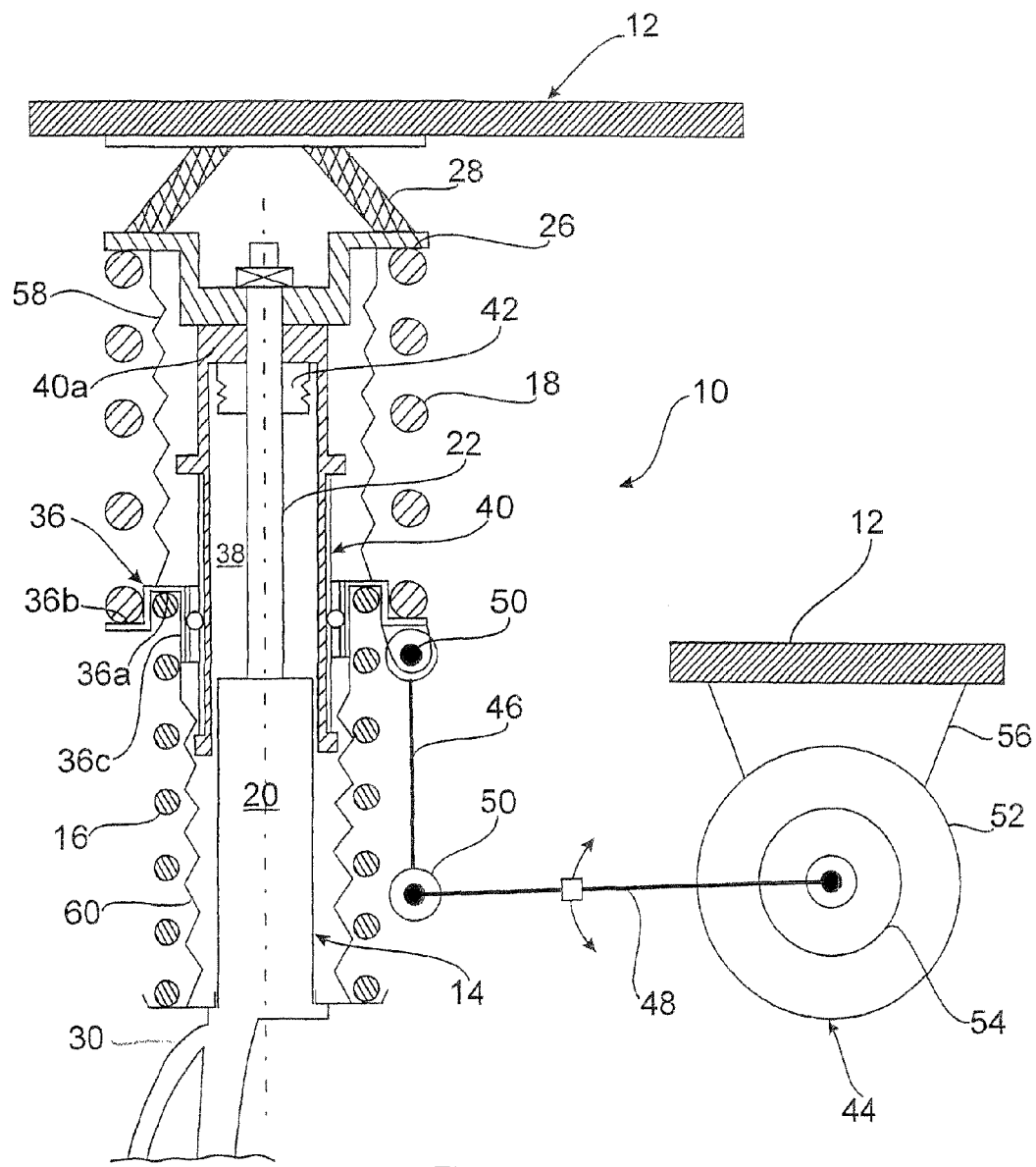
FIG. 1 shows the suspension strut of a front axle wheel suspension for motor vehicles with a preloaded spring, a bearing spring and an electromechanical actuator which acts on the movable spring plate.

FIG. 1 shows the suspension strut 10 of a wheel suspension for motor vehicles which is not shown in greater detail. The wheel suspension for example for the front wheel of a motor vehicle can be made in the manner familiar to one skilled in the art, with upper and lower individual arms which are articulated to the body 12 (merely outlined) of the motor vehicle and a wheel carrier.

The suspension strut 10 which is composed essentially of a telescoping shock absorber 14, a helical compression spring as the bearing spring 16 and another helical compression spring as the preloaded spring 18, is connected between the body 12 of the motor vehicle and the lower arm of the wheel suspension (or the wheel carrier).

Figure 2:
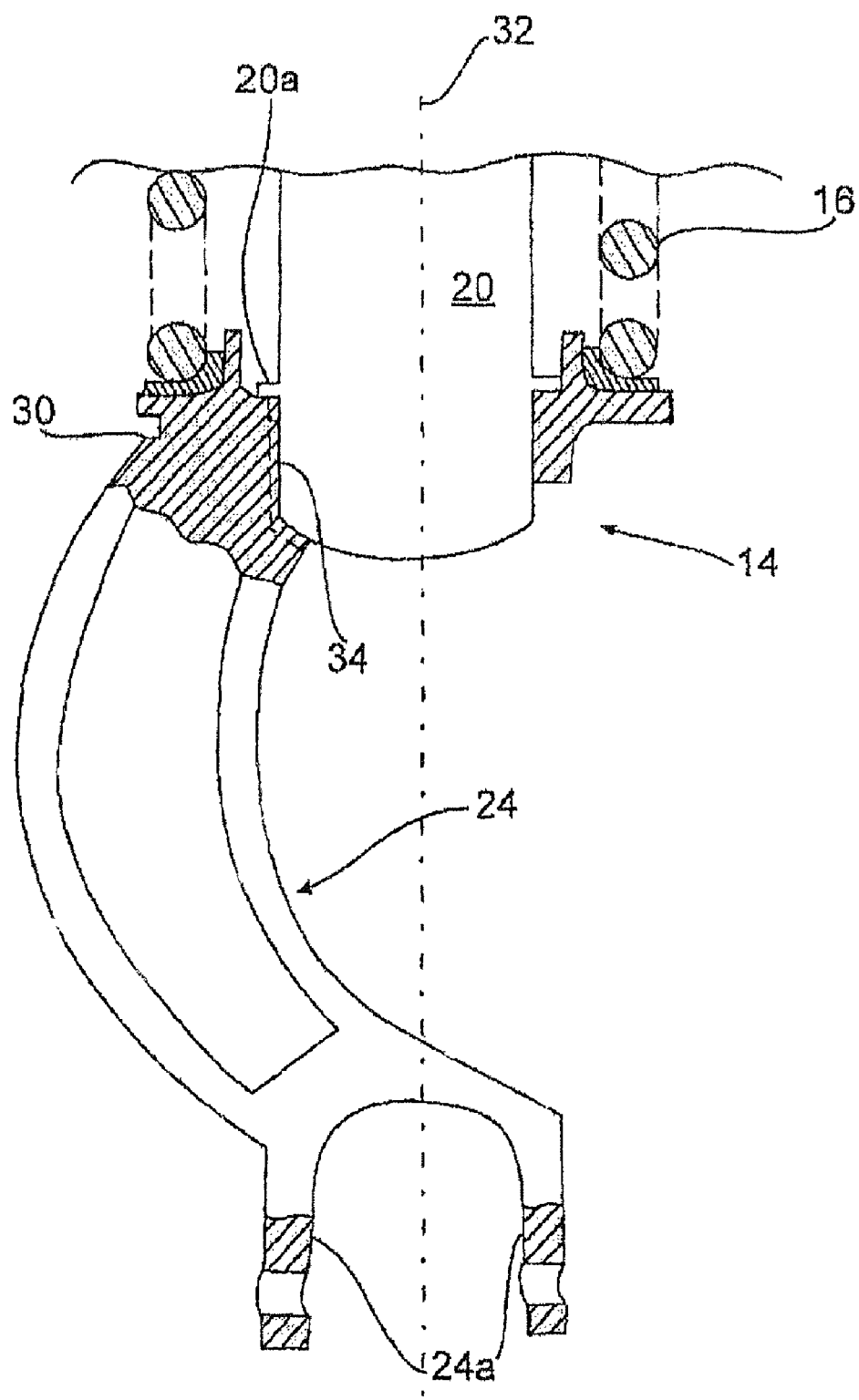
FIG. 2 shows the shock absorber stalk of the suspension strut as shown in FIG. 1 with the spring plate molded on and a central threaded connection to the shock absorber tube.

The shock absorber 14 has a tube 20, a piston rod 22 which can move relative thereto, and a shock absorber stalk 24 which projects down (cf. FIG. 2). The shock absorber stalk 24 is articulated via a fork-shaped connecting part 24a to one arm of the wheel suspension of the motor vehicle, which arm is not illustrated.

The piston rod 22 of the shock absorber 14 is coupled to the body 12 of the vehicle via an upper spring plate 26 and a shock absorber bearing 28. The preloaded spring 18 which is located above the bearing spring 16 is furthermore supported on the spring plate 26 on the body side.

In addition, the lower bearing spring 16 is supported on the shock absorber side by way of the lower spring plate 30. As is to be seen in FIG. 2, the spring plate 30 is molded directly onto the shock absorber stalk 24. In cross section the shock absorber stalk 24 is made in the shape of an H section between the spring plate 30 and the fork-shaped connecting part 24a.

Furthermore, the shock absorber tube 20 is screwed securely into the shock absorber stalk 24 by means of a threaded connection 34 which is aligned coaxially to the center axis 32 of the shock absorber. For this purpose the shock absorber tube 20 has an outside thread which is screwed into a corresponding inside thread of the shock absorber stalk 24 as far as a ring-shaped stop 20a on the shock absorber tube 20.

Between the bearing spring 16 and the preloaded spring 18 (cf. FIG. 1) there is an axially movable spring plate 36 which has a ring-shaped support surface 36a which acts downwardly for the bearing spring 16 and a ring-shaped support surface 36b which is aligned to the top for the preloaded spring 18. The indicated support surfaces 36a, 36b are matched to the larger diameter of the preloaded spring 18 and to the smaller diameter of the bearing spring 16 and are vertically offset to one another such that the respective end winding of the springs 16, 18 lie more or less at the same height internested in one another. The offset could also be extended to several spring turns if structurally necessary.

The spring plate 36 has a radially inner hub section 36c which is guided to move axially on the guide sleeve 40 via a linear antifriction bearing 38 with several peripherally offset rows of balls. The balls are positively guided in the peripheral direction in the manner conventional for linear bearings in ball tracks (without reference numeral) which are molded axially parallel into the hub section 36c and into the guide sleeve 40.

The guide sleeve 40 is attached to the spring plate 26 with a base section 40a. Moreover, an additional rubber-elastic spring 42 which is located on the piston rod 22 is supported on the base section 40a and comes into contact with the opposite face of the shock absorber tube 20 as the wheel suspension of the vehicle springs sharply and optionally with high loading and thus acts as an additional spring which increases the spring rate of the bearing spring 16.

On the spring plate 36 which can move along the middle axis 32 of the shock absorber 14 an electromechanical actuator 44 which is not detailed is coupled by way of a more or less vertically running connecting rod 46 and a more or less horizontally running lever 48 by way of the corresponding joints 50.

The actuator 44 is composed of a hollow-shaft electric motor 52 and gearing 54 and is attached torsionally stiff to the body 12 on a longitudinal member 56 which is located more or less at the height of the tube 20 of the shock absorber 14 (or a suitable cross member). The gearing 54 can be made self-locking and/or the electric motor 52 can be provided with a brake which is active in the inactivate state. Furthermore, there can be a measurement means for the instantaneous level position of the motor vehicle, in the conventional manner.

Figure 3:
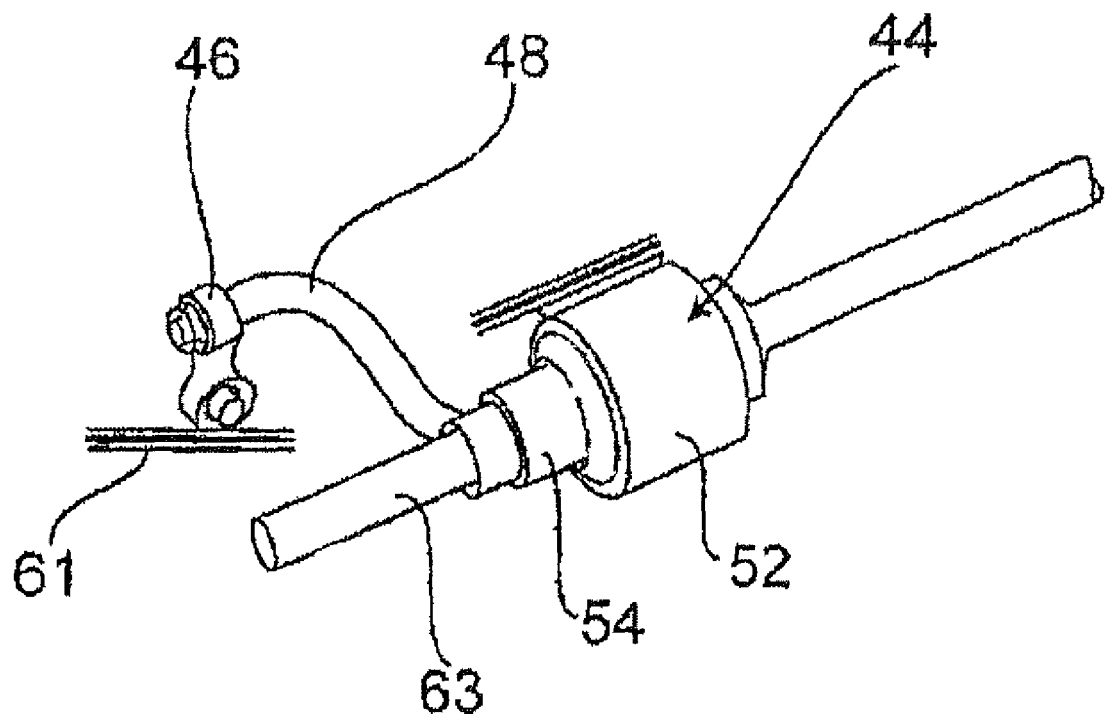
FIG. 3 shows roughly schematically an actuator of identical basic execution for a rear axle wheel suspension.

The external arrangement of the actuator 44 with the lever 48 and the connecting rod 46 outside the suspension strut 10 and on the body 12, 56 enables use of the actuator 44 as such as an identical part both for front axle wheel suspensions of a motor vehicle as are shown in FIGS. 1 and 2, and also for rear axle wheel suspensions as are shown roughly schematically in FIG. 3.

The design of the preloaded spring 18 is preferably such that with the motor vehicle unloaded and in its design position the spring forces of the bearing spring 16 and of the preloaded spring 18 are more or less in equilibrium. Thus the movable spring plate 36 is free of force with reference to the actuator 44, i.e., that support forces are not acting on the actuator 44.

By pivoting the lever 48 down, the spring plate 36 likewise pushed down by way of the connecting rod 46 and thus the vehicle level is raised (greater ground clearance), and with the reversed actuation, lowered. Only the differential forces from the bearing spring 16 and the opposing preloaded spring 18 as well as forces from wheel load changes (loading, spring movements from roadway unevenness, etc.) need be applied by way of the actuator 44.

As indicated in FIG. 1, between the spring plate 26 and the movable spring plate 36 as well as between the hub section 36c of the spring plate 36 and the lower, fixed spring plate 30, there can be rubber-elastic protective sleeves 58, 60 which counteract penetration of dirt and moisture especially into the linear antifriction bearing 38.

FIG. 3 roughly schematically shows the rear axle of the motor vehicle, with dynamic adjustment which takes place by means of an actuator 44 which is structurally identical to the actuator 44 indicated in FIG. 1 and acts on a rear axle component 61, for example a trapezoidal arm. The actuator 44, as already described using FIG. 1, has a hollow-shaft electric motor 52 and gearing 54 which is, for example, planetary gearing or harmonic drive gearing.

As follows from FIG. 3, a torsion bar 63 is flanged to the actuator 44; on the lateral end area of the bar a lever 48 is attached which transfers a pivoting motion to the connecting rod 46 or to the trapezoidal arm 61 coupled to the connecting rod 63. Therefore, according to the invention, identical actuators 44 can be used both for the front and also the rear axles each in their basic execution. The resulting synergy effects reduce costs.

The invention claimed is:

1. A suspension strut interconnectable between a vehicle body and a component of a wheel suspension system of the vehicle, comprising:
    a shock absorber having a base component connectable to one of said vehicle body and said suspension component and a rod component connectable to the other of said vehicle body and said suspension component;
    an annular member encompassing said shock absorber and displaceable axially relative thereto;
    a bearing spring disposed between a portion of said base component of said shock absorber and said annular member;
    a preloaded spring disposed between a portion of said rod component of said shock absorber and said annular member;
    means supported on said vehicle body for selectively producing a motion; and
    means operatively interconnecting said motion producing means and said annular member for transmitting said motion to said annular member, including means for translating said motion to axial motion of said annular member relative to said shock absorber, wherein said motion producing means comprises an electric motor and said motion translating means comprises a first link connected to and pivotal relative to the axis of an output shaft of said motor, and a link interconnecting said first link and said annular member.

2. A suspension strut according to claim 1 including means disposed on one of said base and rod portions of said shock absorber for guiding said annular member axially relative to said shock absorber.

3. A suspension strut according to claim 1 wherein said springs are disposed coaxially.

4. A suspension strut according to claim 1 wherein said first link comprises a lever arm disposed radially relative to the axis of the output shaft of said motor.

5. A suspension strut according to claim 1 wherein said springs comprise coil springs and said preloaded spring has a diameter greater than the diameter than said bearing spring.

6. A suspension strut according to claim 1 including an elastomeric member mounted on said rod component and connectable to said vehicle body.

7. A suspension strut according to claim 1 including a strut segment connectable to one of said vehicle body and a suspension system component which supports said base component of said shock absorber.

8. A suspension strut according to claim 7 wherein said base component is connected to said strut segment by means of a threaded connection.

9. A suspension strut according to claim 7 wherein said bearing spring is supported on said strut segment.

* * * * *